United States Patent [19]
Browning

[11] Patent Number: 4,725,135
[45] Date of Patent: Feb. 16, 1988

[54] OPTICAL ENTERTAINMENT OF AMUSEMENT STRUCTURE AND DEVICE

[75] Inventor: Michael R. Browning, Flinders, Australia

[73] Assignee: Concorde St. George Productions Pty. Ltd., South Melbourne, Australia

[21] Appl. No.: 913,648
[22] PCT Filed: Dec. 23, 1985
[86] PCT No.: PCT/AU85/00323
 § 371 Date: Aug. 21, 1986
 § 102(e) Date: Aug. 21, 1986
[87] PCT Pub. No.: WO86/03683
 PCT Pub. Date: Jul. 3, 1986

[30] Foreign Application Priority Data
Dec. 21, 1984 [AU] Australia ............................ PG8673
Mar. 5, 1985 [AU] Australia ............................ PG9566

[51] Int. Cl.⁴ ............................................. G03B 37/00
[52] U.S. Cl. ..................................... 353/122; 353/119; 353/1; 352/85
[58] Field of Search ................. 353/119, 122, 1, 2; 352/69, 70, 85, 89; 350/4.1, 4.2; 272/2, 84, 10, 13; 52/6

[56] References Cited
U.S. PATENT DOCUMENTS
1,518,204 12/1924 Husted .
2,099,904 11/1937 Pennington .
2,173,162 9/1939 Gilluly .
2,280,206 4/1942 Waller et al. ...................... 52/6 X
3,482,896 12/1969 Bogosian .
3,502,402 3/1970 Markson ......................... 352/85 X
3,776,621 12/1973 Worland ........................ 350/4.1

FOREIGN PATENT DOCUMENTS
175492 2/1922 United Kingdom .

Primary Examiner—Harry N. Haroian
Attorney, Agent, or Firm—Merchant, Gould, Smith, Edell, Welter & Schmidt

[57] ABSTRACT

An entertainment or amusement device or structure (10), having an elongate chamber (18) bounded along it length by at least three elongate, substantially planar walls (22, 24) with at least two adjacent ones of those walls (22, 24) having reflective surfaces. The device has an image generating means (30) by which a primary image can be formed across one end of the chamber (28) so as to result in secondary images being generated by reflection of the primary image by the reflective surfaces. Also, the structure (10) is adapted to enable viewer access (20) for simultaneous viewing of the primary image and the secondary images. In the case of a structure (10), the viewer access is enabled by a gallery (20) at the end of the chamber remote from the one end (28). Typically, the reflective surfaces (22, 24), and optionally also a screen (28) of the image generating means, are defined by reflective tiles so that the secondary images, and optionally the primary image, is perceived as comprised of pixels. The chamber (18) may be of constant cross-sectional form, but may taper to the one end thereof such that the primary and secondary images are perceived as if on the surface of a sphere of massive relative proportions.

8 Claims, 13 Drawing Figures

OPTICAL ENTERTAINMENT OF AMUSEMENT STRUCTURE AND DEVICE

This invention relates to an entertainment or amusement device, and to a building structure in accordance with such device, which enables an optical effect somewhat similar to that of a kaleidoscope.

The kaleidoscope, an optical device invented by David Brewster in 1817, has retained its standing as a favourite children's toy. It also is said to have provided a source of inspiration for creators of decorative designs, in forming patterns suitable for textiles, jewellery and the like.

In its simplest form, a kaleidoscope includes a cylinder in which two reflective strips extend longitudinally, with the strips being at an angle of which 360° is a multiple. One end of the cylinder has a cover provided with a central eye-hole; while the other end of the cylinder is closed by two spaced discs between which small coloured objects are loosely located. The innermost and outermost disc respectively is transparent and translucent, such that light can enter the other end of the cylinder. When the kaleidoscope is held to the eye with the other end of the cylinder pointed to a light source, coloured objects between the discs and within the angle between the reflective strips are viewed direct as a primary image, but simultaneously with an angular array of images. Rotating or shaking the kaleidoscope results in changes of the images.

A device according to the invention has an elongate chamber bounded along its length by at least three elongate, substantially planar walls with at least two adjacent ones of those walls having a reflective surface. The structure also includes an image generating means by which a primary image can be formed across one end of the chamber so as to result in secondary images being generated by reflection of the primary image by the reflective surfaces. Additionally, the structure is adapted to enable viewer access for simultaneous viewing of the primary image and the secondary images.

The building according to the invention is in the form of such device. The building most conveniently is on a substantial scale; the chamber for example having a length of about 40 to 80 feet, and a width and height of the order of one quarter to half, preferably about one-third, of its length. The chamber most preferably is of substantially symmetrical, constant sectional form transversely of its length; a triangular section, such as an equilateral triangular section, being preferred. However, other polygonal sections, preferably regular or equi-sided, can be used.

The principal difference between a device according to the invention and a structure according to the invention is the scale on which each is built. The device most conveniently is substantial in size compared with a conventional kaleidoscope, the chamber for example preferably having a length of from about three feet to about ten to fifteen feet, with the ratio of length to width being for example as detailed in the preceding paragraph. The building on the other hand preferably is massive in comparison; the building for example preferably enabling a number of viewers to view simultaneously the primary and secondary images at the one end, from the other end, whereas the device may enable only one or two viewers to have access to the other end at a time.

Most conveniently all wall surfaces bounding the chamber having substantially planar, reflective surfaces. In this regard, "wall surface" is used for convenience to designate both those surfaces which extend upwardly, as well as those which extend horizontally so as to constitute what normally would be referred to as a ceiling or flooring surface.

The reflective surfaces each may be defined by a layer of glass mirror. Alternatively, it may be defined by a smooth metal layer, such as polished sheet metal, or a deposited film of metal provided over a substrate of sheet glass, plastic sheet or the like. In a further alternative, the reflective surfaces may be defined by metallized plastic film provided over such substrate or over a substrate of ceramic, wood or other stiff board material.

The reflective strips used in a kaleidoscope can be sufficiently planar to avoid any discernable distortion, due to the relatively small dimensions of such toy. However, this generally is not the case when each reflective surface of the invention is provided by a layer of glass mirror, polished sheet metal, a film of metal deposited on a substrate sheet or metallized film provided on a substrate, over the areas required by the present invention. That is, the secondary images obtained with such layers inevitably will be discernably distorted by comparison with the primary image due to variations in each reflective surface from a respective plane and, in the case of a glass mirror in particular, due to variations in the glass thickness. Also, there are practical limits to the sizes in which sheets of glass, metal, plastics, ceramic, timber or other board material can be obtained, such that the reflective surfaces, if provided by large sheets, will be further marred by junctions between adjacent sheets.

In a preferred form of the invention, the reflective surfaces are provided by use of relatively small reflective tiles, such as of the area used for wall or floor tiling. The tiles may be square or other shape enabling them to be placed in a continuous, side-by-side array. Square tiles are preferred in one form of the invention, and may have a side dimension of from about 2 to 6 inches; 3×3 inch tiles being most preferred. However, in another form of the invention, the tiles of such area may have the shape of a diamond or parallelogram.

Where the reflective surfaces are provided by reflective tiles, it is virtually impossible to position these with their reflective surfaces in a common plane over the areas required. However, while a non-planar surface is a disadvantage in large sheets, this can be used to advantage when the surface is made up by tiles. That is, the extent to which the surface of an individual tile is non-planar will not be discernable. Also, actual distortion of an overall secondary image between adjacent tiles, due to their surfaces being in slightly non-planar relation, will not be perceived as distortion but as due to the secondary image being formed as a mosaic of picture elements somewhat akin to an enlarged T.V. picture or an image comprised of pixels generated by a computer graphics system.

The image generating means may include a screen disposed across the one end of the chamber and an image source for generating an image on the screen. In a first arrangement, the screen is disposed substantially at right angles to the longitudinal extent of the chamber. In that arrangement, the image source may be a projector or a light source positioned beyond the one end of the chamber so as to provide a primary image on the screen by rear projection or to provide a silhouette primary image on the screen by back-lighting of action occurring between the screen and light source.

In an alternative form of the first screen arrangement, the image source may be a projector positioned in, or beyond the other end of the chamber, to provide a primary image on the screen by front projection; the projector preferably projecting the primary image substantially normal to the screen. The screen may be of a material, such as SCOTCHLITE, which reflects back along the incidence rays, although a conventional or omni-directional screen surface can be used depending on the effect desired.

In a second arrangement, the screen is disposed at an angle to the longitudinal extent of the chamber. In that arrangement, the image source may be a projector positioned to provide a primary image on the screen by front projection. The image source preferably projects such image along an axis which has an acute angle of incidence with respect to the screen; with the screen preferably being at an angle to the longitudinal extent of the chamber such that an equal angle of reflection from the screen is substantially parallel to the longidutinal centre-line of the chamber.

Where the screen has a smooth viewing surface, a primary image generated thereon inevitably is visually distinguishable from the secondary images generated by reflection. As already indicated, the secondary images may be discernably distorted where the reflective surfaces are continuous over large areas; while the secondary images will appear to be made up of pixels where the reflective surfaces are defined by tiles. In either case, the visually distinct primary image may produce a required result for a given programme content of that image.

The extent to which the primary image is distinguishable can be reduced, if required, by use of an alternative form of screen suitable for front projection in conjunction with reflective surfaces defined by tiles. In that form, the screen also is made up of tiles of a shape and size corresponding to that of the tiles of the reflective surfaces. However, the screen tiles most preferably are spaced slightly from each other to define a narrow slot between adjacent edges of successive screen tiles. The slots preferably are such that when the primary image generated on the screen is viewed from the other end of the passage, that image itself appears as if made of pixels. However, the slots most preferably are such that as the primary image is seen in the reflective surfaces, the slots are not visible so that the pixel form of the primary image is not marred by that form being out of register with the pixel form resulting in the secondary images due to the tile form of the reflective surfaces.

The pixel form required in the primary image preferably is achieved by the inner extent of the slots being light absorbing. To avoid that pixel form being superimposed by the pixel form resulting in the secondary images, the edge of each screen tile has bevel faces and, like the front face of each screen tile, is light reflective. Such bevell faces preferably are such that, as the screen and primary image is seen in the reflective surface, the screen and primary image appears as continuous rather than slotted.

The foregoing forms of the image generating means principally are suited to the form of the invention comprising a building, although they also can be used in the form comprising a device. An alternative image generating means for a device comprises a T.V. receiver positioned with the face of its picture tube positioned across the one end of the chamber. In that case, a picture generated by the receiver, from an input thereto, provides the primary image.

The chamber in the form of the invention comprising a building, may have an access for viewers at its other end, i.e. at the end remote from the one end at which a primary image is formed. The access may comprise a gallery in which viewers can view the primary and secondary images; the gallery preferably having a plurality of levels. The gallery may provide standing room for viewers, or it may be provided with seats. In one convenient arrangement, the gallery floor comprises at least one moving path, such as an endless belt, so that viewers are transported across the other end between an entrance and an exit.

In an alternative form, the gallery may extend longitudinally into the chamber. In such case, the gallery may comprise a longitudinally extending walk-way or moving path such as to enable viewers to pass from an entrance beyond the other end, into the chamber and then from the chamber through an exit opening outwardly of the chamber.

The at least three walls may extend in substantially parallel longitudinal relationship. In such case, the secondary images are formed in a substantially planar array around the primary image. However, in a preferred form of the invention, suited to either the building or device form of the invention, the chamber decreases in cross-sectional area from one end to the other due to the walls being mutually inclined longitudinally of the chamber. The chamber may be either of greater cross-sectional area at the end at which the primary image is formed, but most preferably is of lesser cross-sectional area at that end. In each case, the secondary images, because of the inclination of the side walls appear as an array formed on a three-dimensional curved surface; that surface curving toward or away from the viewer depending on whether the walls diverge or converge in a direction away from the viewer.

BRIEF DESCRIPTION OF THE DRAWINGS

In order that the invention may more readily be understood, description now is directed to the accompanying drawings, in which.

DETAILED DESCRIPTION OF THE PREFERRED EMBODIMENTS

Figure 1:
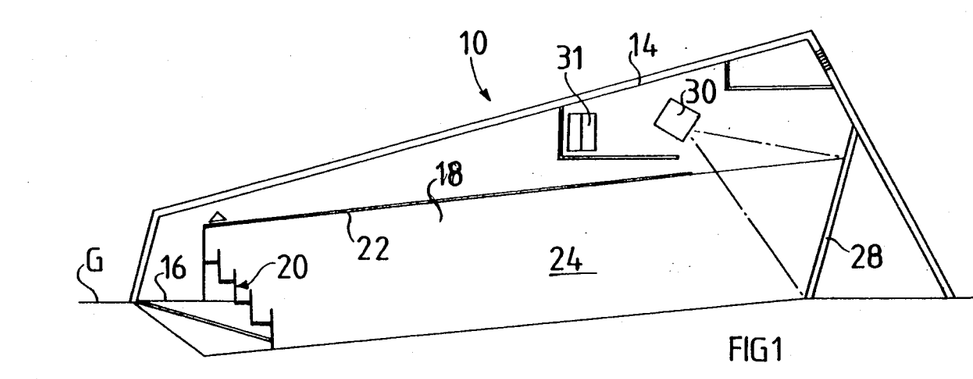
FIG. 1 is a schematic, longitudinal sectional view of a building structure.
Figure 2:
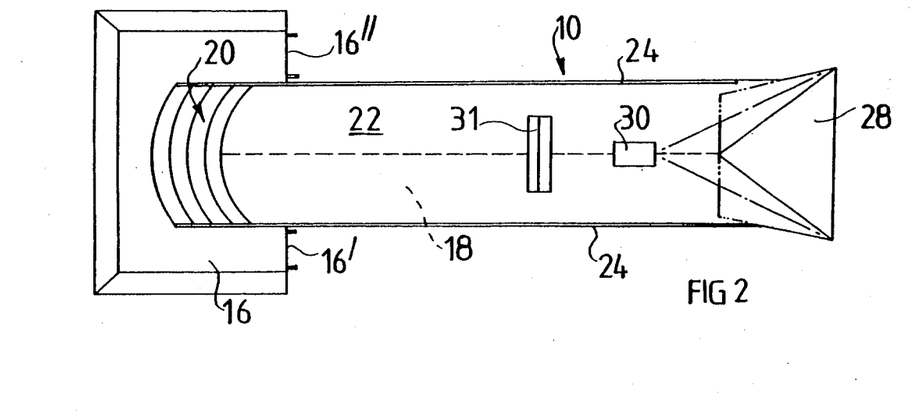
FIG. 2 is a plan view of the structure of FIG. 1.
Figure 3:
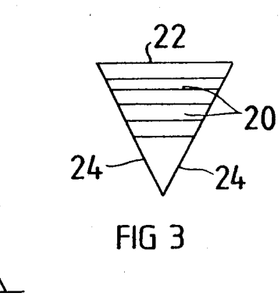
FIGS. 3 to 5 are schematic representations of aspects of the structure.

In FIGS. 1 and 2, the structure 10 comprises an external housing 14 which increases in height toward the right hand end. At the left hand end, housing 14 has an enlarged enclosure defining a lobby 16. Within housing 14, there is a longitudinal chamber 18 which extends from a multi-level gallery 20 within lobby 16, and terminates before the end of housing 14 remote from the lobby. Structure 10 may, if required, be partly below ground level G, as shown.

Chamber 18 inclines upwardly at a small angle from lobby 16, and is of an equilateral triangular cross-section provided by a horizontally disposed top wall 22 and downwardly and inwardly inclined side walls 24; each of walls 22,24 being substantially parallel to the longitudinal axis of chamber 18. Substantially the full extent of the inner surface of each wall 22,24 is covered with a regular array of reflective tiles 26 (see FIG. 5), such as of 3×3 inch squares of reflective stainless steel sheet. Walls 22,24, due to tiles 26, thus define reflective surfaces.

In the remote end of housing 14, a screen 28 is located across the end of chamber 18. Screen 28 may be triangular or of a size such that a triangular area of it can be viewed from gallery 20. Screen 28 is inclined so that its top is further from gallery 20 than its base; the top being spaced from the end of wall 22. A slide or motion picture projector 30 is positioned above that end of wall 22 for projecting a primary image onto screen 28. The angle of incidence of the axis along which light from projector 30 passes to screen 28 preferably is such that an equal angle of reflection is along the centre-line of chamber 18. Projector 30 preferably has a lens which compensates for the increasing projection distance toward the bottom of screen 28.

Viewers are able to pass into and from lobby 16 via doorways 16', 16" and across the adjacent end of chamber 18, at a selected level of gallery 20. Locking along chamber 18, viewers can observe a primary image projected on screen 28 from projector 30, as well as a plurality of secondary images produced by multiple reflections of the primary image produced by tiles 26.

Figures 5, 6:
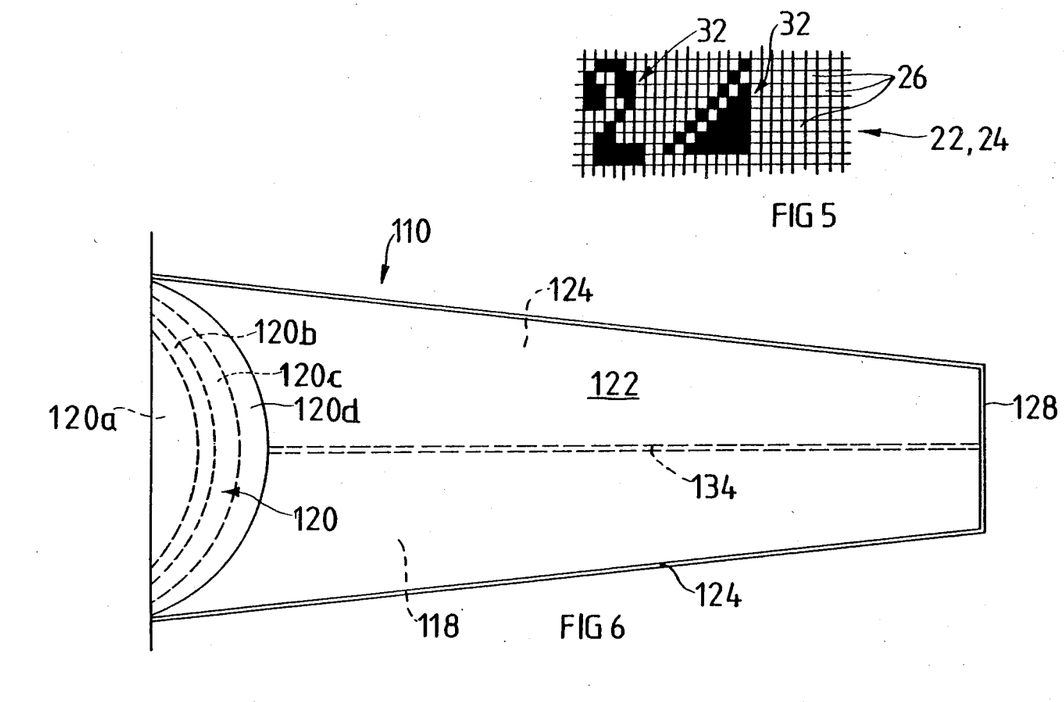
FIG. 6 is a plan view of an alternative structure.

Due to random, slight variations in the reflective orientation of adjacent tiles 26, the secondary images appear to be build up from a mosaic of picture elements such as shown at 32 in FIG. 5. Screen 28 can be a white or silvered screen, such as of conventional form and, in such case, it will not be of such mosaic form and discernable as differing from the secondary images. However, if required, the surface of screen 28 also can be provided with an array of similar tiles so as to minimise perceivable differences between the primary image and the secondary images.

Figure 4:
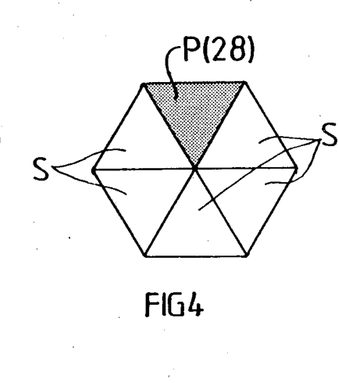

FIG. 4 shows a typical multi-image cluster formation of the primary and secondary images. This comprises a primary image P, and five secondary images S of a first series of secondary images. Around that cluster, will be produced a second series of secondary images, with further successive series extending infinitely therearound and uniformly from all three sides of the primary image.

Walls 24 may be fixed. Alternatively, one or both may be pivotally mounted along its upper edges so as to be movable outwardly for access to chamber 18 for servicing. The tiles 26 may be permanently fixed on walls 22,24 (and screen 28 if also provided thereon). Alternatively, the tiles can be releasably fixed or bonded to permit replacement. Also, while tiles 26 most conveniently are uniform in size, this is not necessary.

Thus, tiles 26 may progressively decrease in size away from screen 30 such that the perceived size of all tiles with increasing distance from gallery 20 is substantially constant.

Preferably structure 10 includes a sound system. That system, and/or projector 30 may be operable by computer control centre 31, preferably such that sound and image can by synchronised.

Lobby 16 preferably is such that external light, other than necessary only to guide viewers to and through gallery 20, is excluded from chamber 18. The arrangement most preferably is such that viewers in gallery 20 are aware substantially only of light producing the primary image and the resultant secondary images.

With reference to FIG. 6, there is schematically shown therein a structure 110 in which parts corresponding to those of structure 10 of FIGS. 1 and 2 are identified by the same reference numeral plus 100. Structure 110 differs from structure 10 principally in the inclination of walls 122,124, the provision of screen 128 perpendicular to the axis of chamber 118 defined by those walls, and the form of gallery 120.

Walls 122,124 are mutually inclined such that chamber 118 decreases in cross-sectional area from gallery 120 to screen 128. The extent of such inclination is chosen so that a required secondary image format as illustrated in FIG. 7 is achieved.

Figure 7:
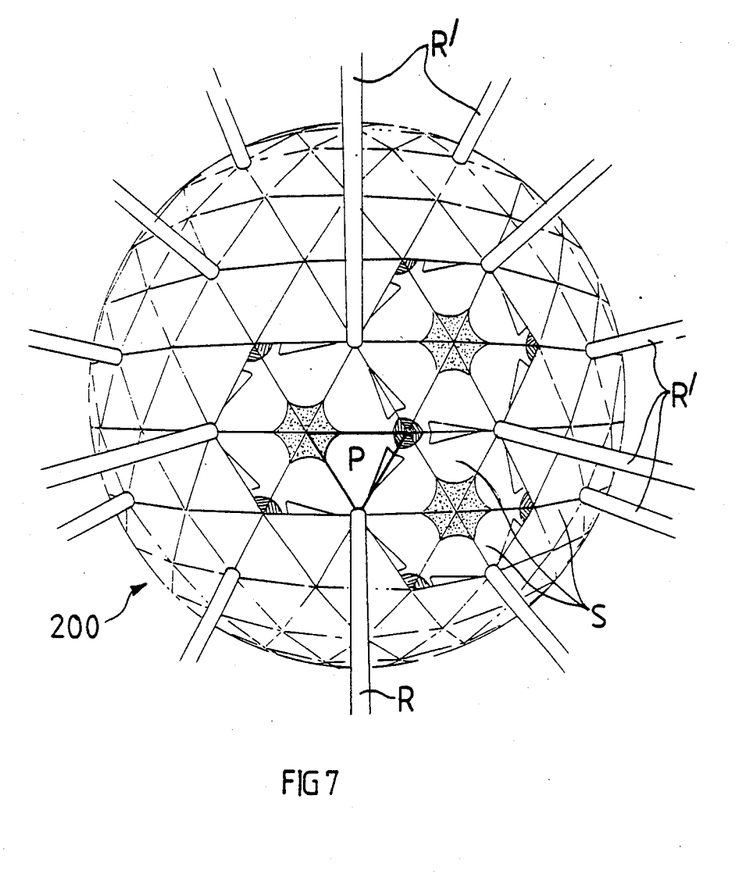
FIG. 7 depicts the form of overall image obtained with the structure of FIG. 6.

FIG. 7 shows what, for convenience, is herein described as an image sphere 200. A viewer, looking toward screen 128 from gallery 120 would see the primary image generated on the screen; this being represented in FIG. 7 by the triangle P. Around triangle P, there is generated by reflective wall 122,124 a plurality of successive mirror-reversed secondary images, shown by the remaining triangles S. Because of the inclination of walls 122,124, triangles S appear to be inclined away from triangle P in the manner shown, generating sphere 200 of a diameter many times greater than the dimensions of triangle P. While each triangle S will comprise a secondary image corresponding to the primary image at triangle P, the secondary images are shown for only some triangles S; while the nature of the successive mirror-reversals of the primary image in triangles S is depicted in sphere 200.

The walls 122,124 may simply be in overlapping or edge-to-edge contact at adjacent sides longitudinally of chamber 118. However, it is preferred that at least along the adjacent sides of walls 124, at the base of chamber 118, the sides are spaced by a reflective strip 134. Such strip extends longitudinally in chamber 118 as shown in FIG. 6. However, as seen in relation to sphere 200, it has the appearance of a rod R (FIG. 7) projecting toward the viewers. Also, secondary images R' of strip 134 are generated by reflection; the primary image R of strip 134 and its reflections R' of it appearing in relation to sphere 200 as a number of substantially radially projecting rods on which sphere 200 appears to be supported in space.

Walls 122,124 in FIG. 6 terminate at end edges substantially perpendicular to the axis of chamber 118, while screen 128 is adjacent those edges and also substantially perpendicular to that axis. This arrangement, rather than inclined edges and inclined screen as in FIGS. 1 and 2, is preferred as it optimises formation of perceived image sphere 200. However, such inclined arrangement can be used, if required.

Gallery 120 preferably is curved so that its middle portion projects into the end of chamber 118 remote from screen 128. Successively higher levels 120a to 120d thereof may project further into gallery 118.

Figure 8:
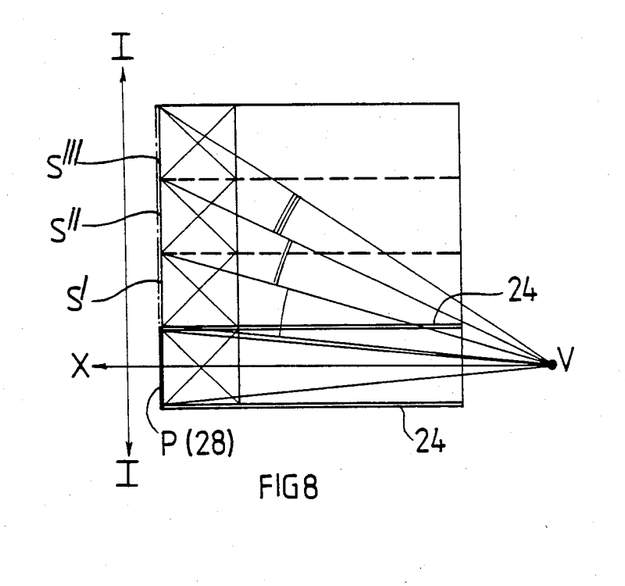
FIGS. 8 and 9 illustrate respective image forming mechanisms for the structures of FIGS. 1 and 6.

FIG. 8 illustrates the form in which secondary images are generated by multiple reflection from walls 22,24 in a parallel wall arrangement such as in FIG. 1, as perceived by a person at viewing position V. The primary image P projected onto screen 28 is seen direct, while successive secondary images S', S" and S'" are perceived as being on a planar viewing surface I—I containing primary image P. While only three secondary images are shown to one side only of primary image, it will be appreciated that successive secondary images extend from all sides of the primary images in a continuous, infinite planar array such as depicted in part in FIG. 4 for two sides of primary image P. Also, extending outwardly from primary image P, successive secondary images are a mirror image of the preceding image, whether this be the primary image or a preceding secondary image.

Figure 9:
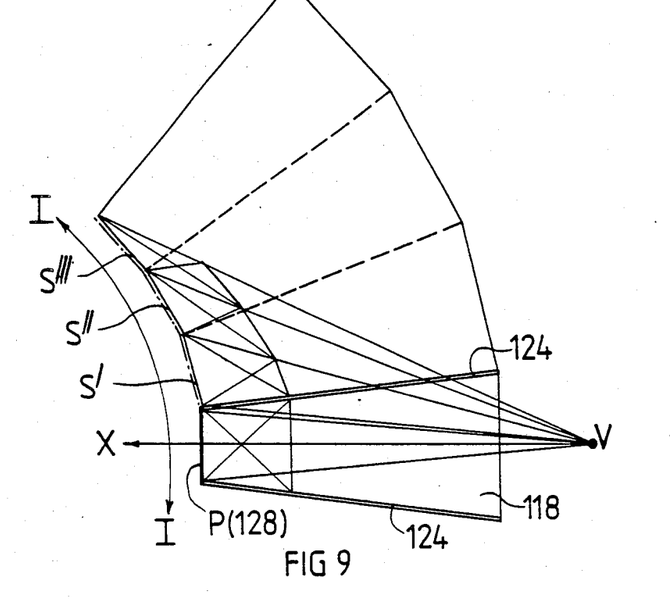

FIG. 9 provides an illustration corresponding to that of FIG. 8 but in respect of a converging wall arrangement 122,124 such as in FIG. 6. In this instance, the viewing surface I—I appears to be curved and approximating to a hemispherical surface, such as shown in more detail in FIG. 7. However, as screen 128 is planar, successive secondary images S', S", S'" etc. are planar, but appear to be in respective planes which are at progressively greater angles to the plane of the primary image P.

Figures 10, 12:
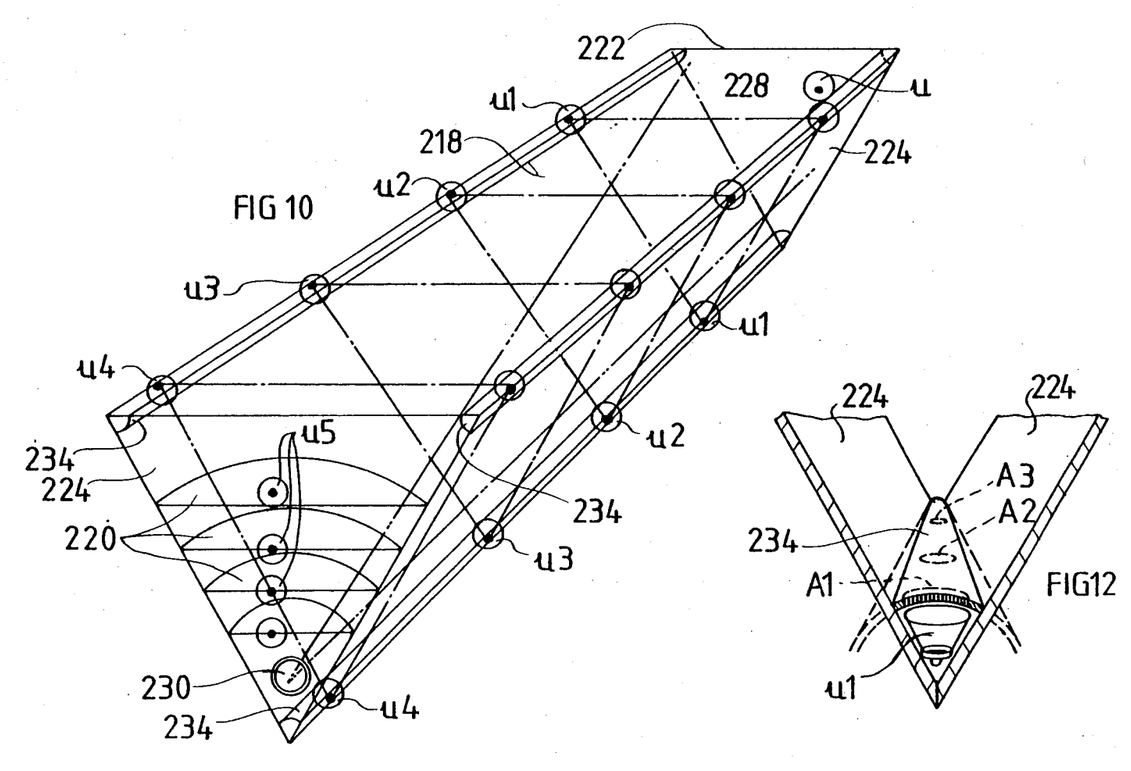
FIGS. 10 and 11 illustrate respective sound system arrangements suitable for a structure such as in FIG. 1 or 6.
FIG. 12 shows an end view of part of the arrangement of FIG. 11.

FIG. 10 schematically depicts in perspective a wall arrangement similar to that of FIG. 1, although the features described below are equally applicable to a converging wall arrangement as in FIG. 6. Those features also are applicable to a diverging arrangement, such as if the screen 128 and gallery 120 of FIG. 6 were at the respective opposite ends.

In FIG. 10, a chamber 218 is defined within walls 222, 224 with, as previously, there being a gallery 220 at one end, a screen 228 at the other end and a projector 230 below gallery 220. In the manner shown in FIG. 12, adjacent edges of walls 224 are bridged, within chamber 218 by a cover strip 234, while each edge of wall 222 and the adjacent respective edge of walls 224 also are bridged by such strip 234.

Rearwardly of screen 228, there is a speaker unit U. In successive transverse planes T1 to T4 there is a further speaker unit U1 to U4 between screen 128 and gallery 220. Also, behind gallery 220, there is an array of further speaker units U5. The speaker units U and U1 and U5, enable perspective sound movement along and, if required, transversely of chamber 218 by conventional control means, such as by cross-mixing the units by cross-faders. Preferably, the actuation of the control means is by a computer, such as depicted at 31 in FIG. 1. Most preferably, the primary image projected onto screen 228 by projector 230 is a motion picture, with such sound movement being in synchronism with action depicted in that picture.

In FIG. 12, each strip 234 is shown as projecting in broken line through and beyond the walls it bridges; this schematically representing secondary images of the strips 234 which, as indicated in relation to FIGS. 6 and 7, are perceived as rods. Also as shown in FIG. 12, each strip 234 preferably has a respective aperture A1 to A4 through which sound from respective speaker units U1 to U4 is able to emerge. Such apertures preferably have a mesh or grill covering which, most preferably, provides substantial visual continuity along the strip.

Figure 11:
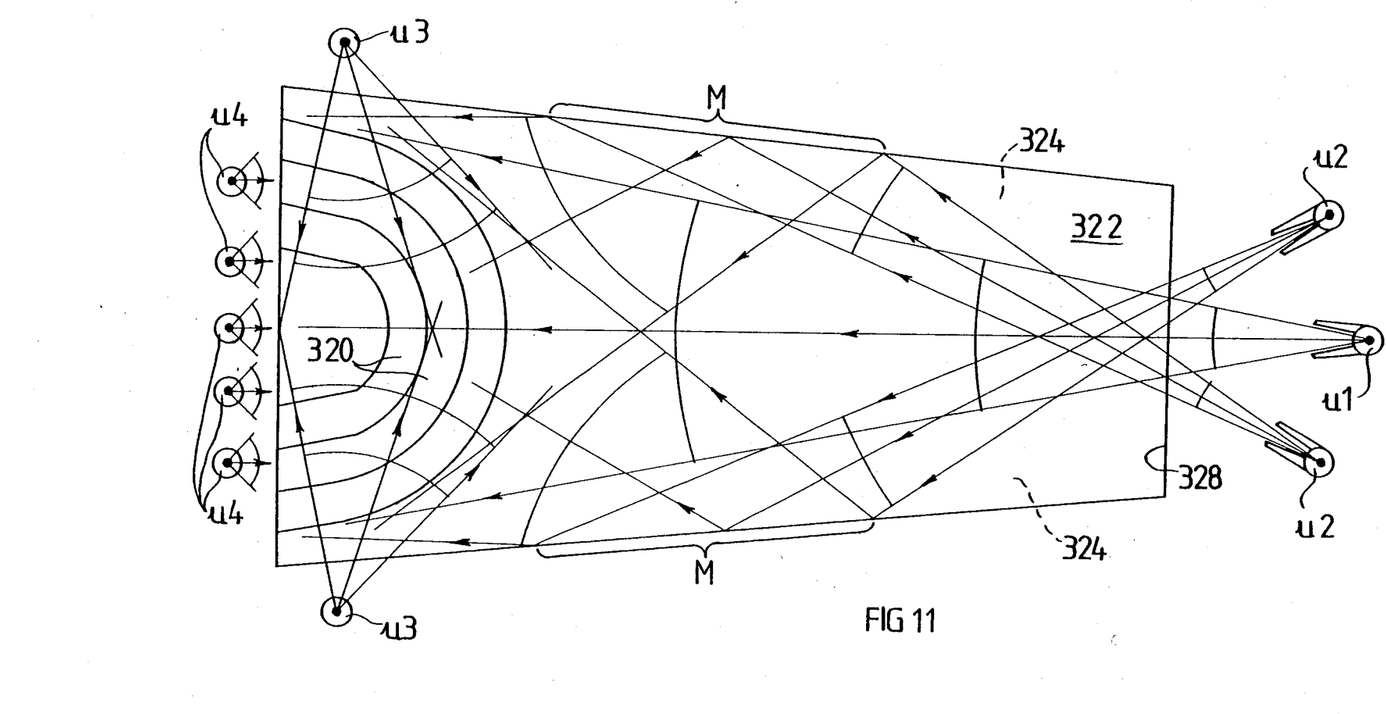

FIG. 11 schematically depicts in plan view a wall structure similar to that of the structure of FIG. 6, although the features described in the following are equally applicable to the wall arrangement shown in FIG. 1. A chamber 318 is defined within walls 322, 324 with there being a gallery 320 at one end and a screen 328 at the other end.

Beyond screen 328, there is a central speaker unit U1 operable to project sound along chamber 318 to viewers in gallery 320. Also beyond screen 328, there are inclined speaker units U2 which, while also operable to project sound along chamber 318, are inclined so that the sound is reflected from walls 322,324 at mid-region M of chamber 318 so that the sound is perceived by viewers as emanating from region M. Spaced laterally of, and also behind the gallery 320, there are respective speaker units U3,U4. Control of operation of speaker units U1 to U4 preferably is as described in relation to FIG. 10 such that the sound perspective is able to be varied forwards and backwards along, and to a degree laterally of, gallery chamber 318.

As shown in FIG. 11, speaker units U1 and U2 have a narrow conical outlet. In the case of unit U1, this is to ensure that substantially all sound from it passes to viewers direct. That is, unit U1 is intended to be perceived as a sound source at its actual location, by sound therefrom not being dispersed by reflection from walls 322,324. Conversely, in the case of units U2, it is required that these are perceived as sound sources which are perceived not as being at their actual location but, by reflection of their sound, as being at region M.

For speaker units U1 and U2, as well as unit U of FIG. 10, the respective screen 328, 228 is required to be of a fabric or other suitable form which does not block or unduly disperse the sound emanating from such unit.

Figure 13:
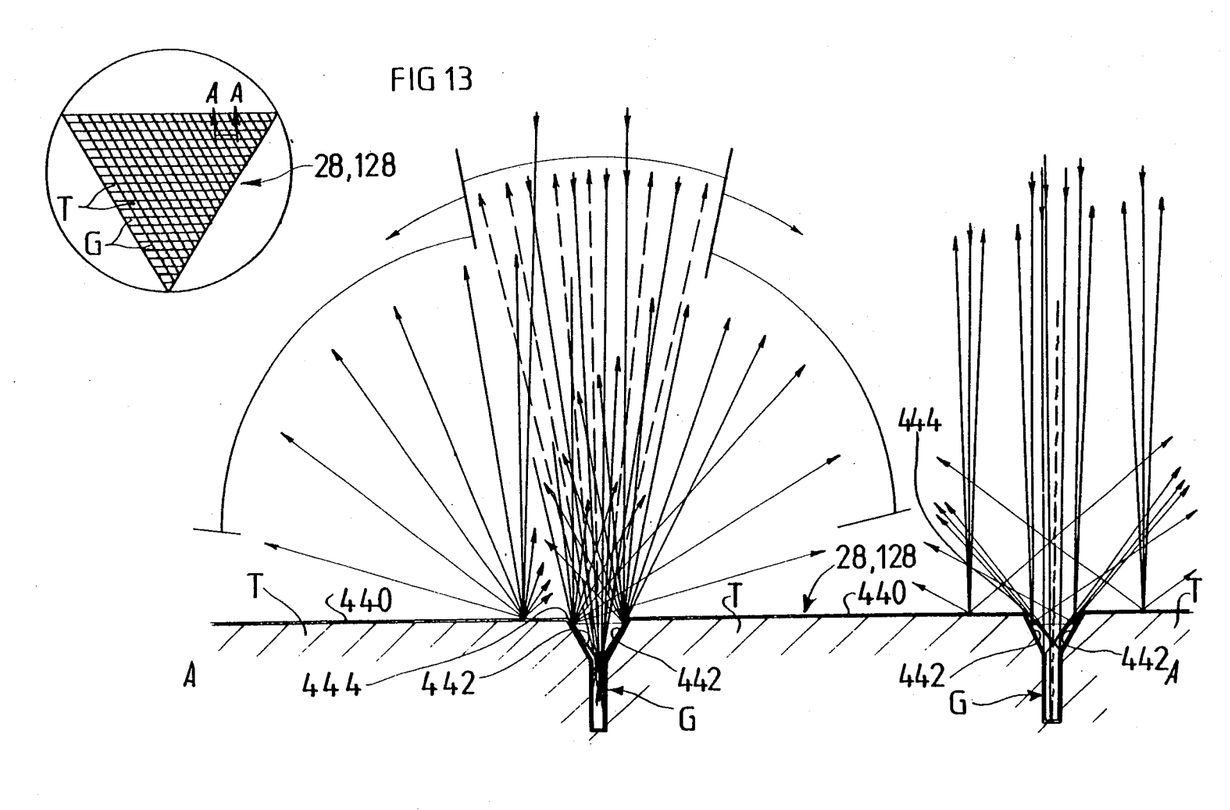
FIG. 13 shows a portion of one form of screen for use in a structure such as shown in FIG. 1 or 6.

FIG. 13 depicts a sectional view through part of a screen, such as screen 28 in FIG. 1 or a screen 128 in FIG. 6. The screen 28,128 as viewed from the gallery has an omni-reflective face 440 on which a primary image can be generated by front projection. The screen is made up of tile or modular elements T, each of which is spaced from adjacent elements T by a channel or groove G.

The grooves have an entrance defined by bevelled marginal faces 442 of the tile elements, with the bevelled margins also being omni-reflective; with edge 444 being curved. However, beyond margins 442, grooves G are light absorbing rather than reflective. Thus, as screen 28, 128 is viewed directly along a gallery, projected light passing into grooves G beyond bevel faces 442 is substantially absorbed. However, light striking face 440 of screen 28,128 between grooves G, or striking reflective bevel faces 442, is reflected along the passage to viewers. The primary image projected onto face 440 thus is of pixel form.

Light striking face 440 between grooves G and light striking bevel faces 442 have a reflected component which passes to viewers at the remote end of the gallery, while light passing into grooves G, between bevel face margins 442 has substantially no reflected component. The viewers thus discern the primary image as made up of pixels corresponding to the separated tiles. However, the angle of bevel face margins 442, which preferably is at an angle of greater than 45° to face 440 such as about 60°, is such that the primary image as seen by reflection from walls 22,24 or 122,124 appears as continuous. That is, the non-reflecting portion of grooves G is not seen by reflection and therefore does not appear in the secondary images.

Most preferably, the tile elements of screen 28,128 are of diamond or parallelogram form, as shown in the encircled insert of FIG. 13. The tiles of the walls 22,24 or 122,124 most preferably are of the same or a similar form. It is preferred that the slots G are at an angle other than a right angle to each of those walls and the reflective surfaces of the latter, as the slots G would become visible in the secondary images and thereby develop an unwarranted multiplication effect.

As indicated, the bevel faces 442 prevent the light absorbing inner region of any of slots G from being seen by reflection, provided that none of slots G are at right angles to the reflective walls of chamber 18,118. Most preferably, all of slots G are at substantially less than a right angle to each of those walls. Also, curved edges 444, between reflective bevel faces 442 and tile element reflective face 440, are important in reducing tonal variation in faces 440,442 as seen in secondary images.

If walls 22,24 or 122,124 defined smooth continuous reflective surfaces, the secondary images thus would appear as not made up of pixels, even though the primary image does appear as of pixels. However, the walls 22,24 or 122,124 preferably have reflective surfaces defined by reflective tiles such that the secondary images also appear as if made up of pixels. The tiles of those wall surfaces may be simply spaced as described above in relation to FIGS. 1 and 6, rather than as spaced by grooves G for the screen. Most preferably the screen and wall tiles are of diamond or parallelogram form as shown in the insert of FIG. 13.

As previously indicated, the elongate chamber may be parallel as in FIG. 1, of decreasing cross-section in a direction toward the screen as in FIG. 6, or of increasing cross-section toward the screen. In the latter case, it will be appreciated that the arrangement can be substantially as in FIG. 6 but with the screen and gallery at the opposite respective ends of the chamber. In that variant of FIG. 6, the secondary images will, as indicated, appear as on the inner surface of a sphere, rather than as shown in FIG. 7.

With further reference to FIG. 1, it will be appreciated that screen 28 can be perpendicular to the axis of chamber 18. However, in such case, the projector preferably is located in gallery 20, with wall 22 not terminating short of the top of screen 28. Also, where the projector location of FIG. 1 is used, wall 22 can extend to the screen, as for walls 24, with the primary image from the projector being projected through an aperture in wall 22.

Front projection, from a projector on or adjacent the gallery, is highly preferred. However, the projector preferably has a gate, constrining its projected beam to a cross-section corresponding to that of the elongate chamber. Such beam preferably attains a cross-section corresponding substantially to that of the chamber adjacent the screen.

The elongate chamber most preferably has a cross-section of substantially equilateral triangular form. Other arrangements are possible, although it is desirable that the chamber be of regular polygonal section, with 360° most preferably being a multiple of the angle between adjacent reflective walls thereof.

As will be appreciated, building structures 10,110 can be operated to provide an array of visual images in a manner akin to that produced by a kaleidoscope. However, the nature and range of possible images is vastly enhanced compared with a kaleidoscope; while viewers can be presented with an image array on a massive scale and experience that array as if from within it. Additionally, the use of reflective tiles at least on surfaces to generate the secondary images of the array enables the secondary images to be perceived as if substantially distortion free.

Finally, it is to be understood that various alternations, modifications and/or additions may be introduced into the constructions and arrangements of parts previously described without departing from the spirit or ambit of the invention.

I claim:

1. An entertainment or amusement building structure having an elongate chamber bounded along its length by at least three elongate, substantially planar walls with at least two adjacent ones of those walls having a reflective surface, an image generating means by which a primary image can be formed across one end of the chamber so as to result in secondary images being generated by reflection of the primary image by the reflective surfaces, the structure being adapted to enable viewer access for simultaneous viewing of the primary image and the secondary images being an illusion of planar/concave/convex forms; said building structure being further characterised in that:
   (a) said image generating means comprises a screen disposed across the one end of the chamber and an image source for generating an image on the screen;
   (b) each of said reflective surfaces is defined by a respective array of reflective surfaces being defined by a respective array of reflective tiles;
   (c) said screen has a viewing surface defined by an array of tile elements;
   (d) successive tile elements of said array thereof being spaced to define therebetween a respective one of a plurality of light absorbing grooves; and
   (e) the tile elements of said array thereof having configured, reflective edges adjacent said viewing surface;
   the arrangement further being such that:
   (f) said tile elements and light absorbing grooves cause said primary image, when viewed from said other end of the chamber, to be perceived as being of a pixel form;
   (g) said reflelctive, configured edges cause said grooves not to be perceived in said secondary images; and
   (h) said array of reflective tiles defining each of said reflective surfaces causing said secondary images to be perceived as being of a pixel form produced by individual reflections from said tiles.

2. A structure according to claim 1, including a viewing gallery at the other end of said passage enabling said viewer access.

3. A structure according to claim 1, wherein said chamber is of triangular section and bounded by three reflective walls.

4. A structure according to claim 1, wherein said screen is a cinematic screen and said image source is a projector.

5. A structure according to claim 1, including a sound system comprising a plurality of speaker units disposed longitudinally and/or transversely with respect to said chamber, and control means for said units enabling selective variation in output of said units.

6. A structure according to claim 5, including computer control means operable to provide said variation in output in synchronism with action in said primary and secondary images.

7. A structure according to claim 1, wherein said chamber has a cross-sectional area which decreases substantially uniformly between its ends.

8. A structure according to claim 7, wherein said chamber has a minimum said area at its one end.

* * * * *